US012663083B2

(12) United States Patent
  Koeninger et al.

(10) Patent No.: US 12,663,083 B2
(45) Date of Patent: Jun. 23, 2026

(54) GAS VALVE WITH OUTWARDLY-OPENING VALVE CLOSURE ELEMENT

(71) Applicant: Robert Bosch GmbH, Stuttgart (DE)

(72) Inventors: Andreas Koeninger, Neulingen-Goebrichen (DE); Bernd Siewert, Stuttgart (DE); Gerhard Suenderhauf, Tiefenbronn (DE); Michael Marzinzik, Nuremberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/264,479

(22) PCT Filed: Jan. 31, 2022

(86) PCT No.: PCT/EP2022/052172
  § 371 (c)(1),
  (2) Date: Sep. 26, 2023

(87) PCT Pub. No.: WO2022/167355
  PCT Pub. Date: Aug. 11, 2022

(65) Prior Publication Data
  US 2024/0044410 A1     Feb. 8, 2024

(30) Foreign Application Priority Data

Feb. 5, 2021    (DE) ..................... 10 2021 201 085.7

(51) Int. Cl.
  *F16K 1/12*      (2006.01)
  *F02M 21/02*     (2006.01)
(52) U.S. Cl.
  CPC ........... *F16K 1/12* (2013.01); *F02M 21/0269* (2013.01)
(58) Field of Classification Search
  CPC ... F16K 1/12; F02M 21/0269; F02M 21/0281
  See application file for complete search history.

(56) References Cited

U.S. PATENT DOCUMENTS

| | | | | |
|---|---|---|---|---|
| 4,574,754 A | * | 3/1986 | Rhoades, Jr. | ...... F02M 21/0275 |
| | | | | 123/298 |
| 4,825,828 A | | 5/1989 | Schlunke et al. | |

(Continued)

FOREIGN PATENT DOCUMENTS

| | | |
|---|---|---|
| AT | 255212 B | 6/1967 |
| CN | 107002595 A | 8/2017 |

(Continued)

OTHER PUBLICATIONS

Translation of International Search Report for Application No. PCT/EP2022/052172 dated May 10, 2022 (2 pages).

*Primary Examiner* — Kevin F Murphy
(74) *Attorney, Agent, or Firm* — Michael Best & Friedrich LLP

(57)           ABSTRACT

The invention relates to a gas valve (1), comprising:
  a valve body (2) which is hollow-cylindrical at least in parts and which forms a sealing seat (3) over which a gas flow path (4) is conducted,
  a reciprocating valve closure element (5) which is accommodated at least partly in the valve body (2) and which has a plate-like end portion (6) arranged outside the valve body, (2) which end portion interacts with the sealing seat (3),
  a sleeve (7) which at least partially surrounds the valve body (2) and the valve closure element (5) and which, together with the plate-like end portion (6) of the valve closure element (5), delimits an annular gap (8) which forms a throttle point in the gas flow path (4) downstream of the sealing seat (3).

15 Claims, 1 Drawing Sheet

(56)  References Cited

U.S. PATENT DOCUMENTS

| 5,752,481 | A | * | 5/1998 | Faulkner | F02B 19/1014 |
| | | | | | 123/294 |
| 7,451,942 | B2 | * | 11/2008 | Borissov | F02M 21/0281 |
| | | | | | 239/584 |
| 10,012,178 | B2 | * | 7/2018 | Schmieder | F02M 21/0269 |
| 2001/0025892 | A1 | | 10/2001 | McCoy et al. | |
| 2005/0082393 | A1 | | 4/2005 | Borissov | |

FOREIGN PATENT DOCUMENTS

| DE | 102014224341 A1 | 6/2016 |
| DE | 102014224344 A1 | 6/2016 |
| DE | 102015225216 A1 | 6/2017 |

* cited by examiner

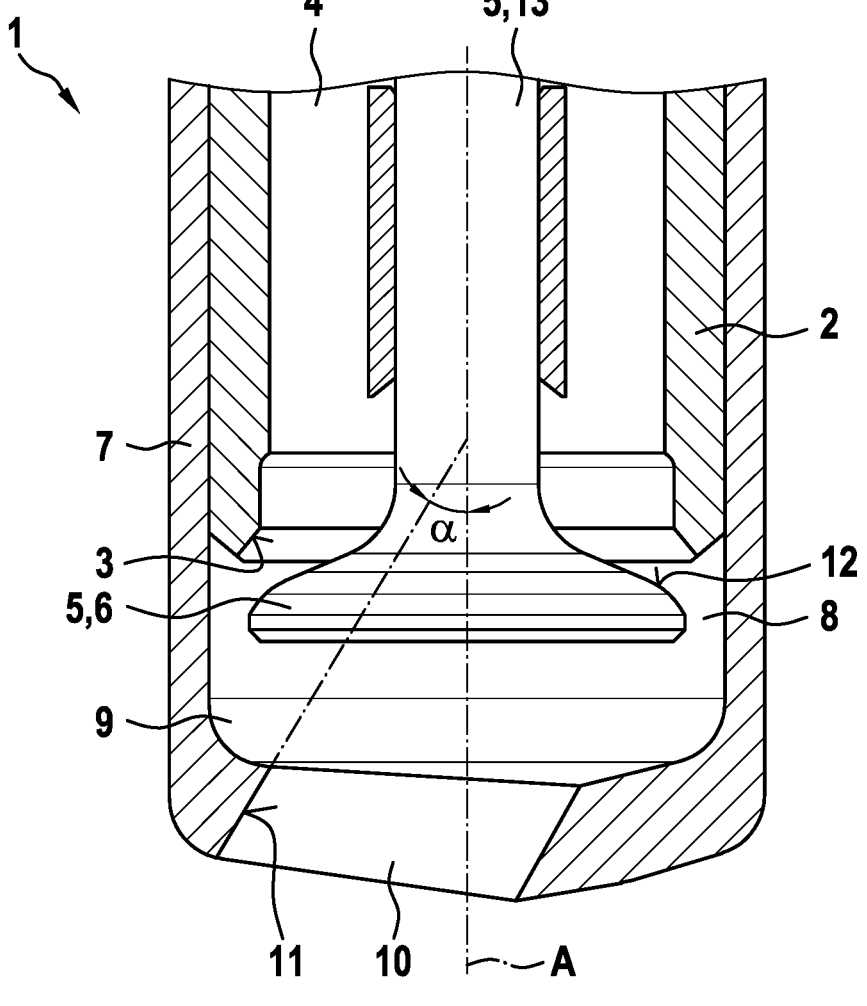

GAS VALVE WITH OUTWARDLY-OPENING VALVE CLOSURE ELEMENT

BACKGROUND OF THE INVENTION

The invention relates to a gas valve with an outwardly-opening valve closure element. For example, the gas valve can be used in order to blow natural gas into a combustion chamber of an engine or into an intake tract located upstream of the combustion chamber. Furthermore, hydrogen can be dosed into an anode circuit of a fuel cell system using the gas valve. The gas to be blown in or dosed in can therefore in particular be a fuel. However, other areas of application are not ruled out.

In the prior art, injector valves for liquid and/or gaseous fuels are described in a variety of embodiments, including those having an outwardly-opening valve closure element. As a rule, an electrically controllable actuator, for example a Piezo or magnetic actuator, pushes the valve closure element out of its sealing seat. The actuator force can act on the valve closure element directly or indirectly, in particular hydraulically. A servo principle can further be employed for indirect control. Also known are embodiments in which the valve closure element is opened purely hydraulically via a pressure increase of the medium to be introduced, in so-called pressure-controlled systems.

If a gas is to be injected or blown in, the challenge is to precisely adjust the mass flow on the one hand and to selectively control the direction of blowing of the gas jet(s) on the other hand. This is because the gas flow reacts particularly sensitively to the counter-pressure present at the valve outlet. This is the case in particular when a subcritical pressure ratio is present at the valve outlet. To increase the dosing accuracy, the cross-section of the outlet opening can therefore be selected to be so small that a supercritical pressure ratio is established at the valve outlet due to the restricted mass flow. However, this results in limited possibilities for jet shaping or jet guiding. This conflict of goals must be resolved.

The patent DE 10 2014 224 344A1 discloses an exemplary gas injector for direct blowing of a gaseous fuel into a combustion chamber of an engine with an outwardly-opening valve closure element and a jet guidance element configured so as to shape a gas jet to be blown into the combustion chamber. For this purpose, the jet guidance element is arranged downstream of a sealing seat for the valve closure element. The mass flow is adjusted via the opening cross-section between the sealing seat and the valve closure element. Because this can vary over time due to wear, precisely adjusting the mass flow over time is difficult.

SUMMARY OF THE INVENTION

The present invention concerns the problem of specifying a gas valve with an outwardly-opening valve closure element, which enables both targeted jet shaping or jet guiding as well as precise dosing when blowing in gas, for example natural gas or hydrogen.

In order to solve this problem, the gas valve according to the invention is proposed. Advantageous further developments of the invention can be found in the subclaims.

The proposed gas valve comprises:
- a valve body which is hollow-cylindrical at least in parts and which forms a sealing seat over which a gas flow path is conducted,
- a reciprocating valve closure element which is accommodated at least partly in the valve body and which has a plate-like end portion arranged outside the valve body, which end portion interacts with the sealing seat,
- a sleeve which at least partially surrounds the valve body and the valve closure element and which, together with the plate-like end portion of the valve closure element, delimits an annular gap which forms a throttle point in the gas flow path downstream of the sealing seat.

The mass flow that is discharged via the gas valve can be adjusted via the throttle point downstream of the sealing seat. Because this location is not subject to any or only minor wear, unlike the sealing seat, a precise adjustment of the mass flow can also be ensured over time. The mass flow can be adjusted very precisely via the surfaces delimiting the annular gap.

A prerequisite for adjusting the mass flow via the throttle point is that the gas valve is opened so widely that the sealing seat is unthrottled. Otherwise, the gas valve forms a further throttle point restricting the mass flow.

Furthermore, the gas valve is preferably, configured such that, upon a maximum stroke of the valve closure element, the flow cross-section of the annular gap forming the flow cross-section is smaller than the flow cross-section between the valve body and the valve closure element in the region of the sealing seat. This ensures that the mass flow is defined via the annular gap alone. Accordingly, the sealing seat is released from this function, or the function usually assigned to the sealing seat is shifted to the region of the throttle point in the proposed gas valve.

The flow cross-section of the annular gap is preferably sized such that a gas flow is generated at the speed of sound and a supercritical state is established independent of an applied counter-pressure.

Further, it is proposed that the flow cross-section of the annular gap is the same over the entire stroke of the valve closure element. That is to say, the flow cross-section and thus the mass flow through the throttle point do not change over the entire stroke of the valve closure element. For this purpose, the sleeve has a consistent inner diameter in the region of the valve closure element.

Advantageously, the gas flow path is conducted through the valve body over the sealing seat and annular gap into a chamber delimited by the sleeve. That is to say, the gas is not discharged directly via the annular gap, but indirectly via at least one opening connecting the chamber to a respective inflation chamber. This design opens up the possibility of performing a targeted jet format or guidance, namely at a location remote from the throttle point. The functions of setting the mass flow and shaping and/or guiding the jet are thus decoupled from one another. The decoupling allows both functions to be optimized independently, so that the aforementioned conflict of goals no longer exists.

In a further development of the invention, it is therefore proposed that the sleeve form at least one inflation opening on its end side for the creation of a gas jet, the flow cross-section of said opening being greater than that of the annular gap. The at least one inflation opening thus does not have a dosing function, but is used exclusively for jet shaping and jet guiding. Due to the decoupling of the functions, the at least one inflation opening can be freely designed. For example, multiple inflation openings can be provided. Further, the size and/or shape can be varied. For example, the opening can be conical.

According to a preferred design of the invention, the inflation opening is delimited by at least one flow conduction surface that is aligned at an angle to a longitudinal axis A of the gas valve. Not only a shaping but also a deflection of the gas jet can be achieved via the angularly arranged flow conduction surface. The design of the inflation opening can also be such that the opening cross-section opens up a very large angular range, for example an angular range of >90°, for the gas jet.

Furthermore, it is proposed that the sealing seat be tapered and open towards the plate-like end portion of the valve closure element. The sealing seat thus allows for a self-centering of the valve closure element upon closing.

Preferably, the plate-like end portion of the valve closure element forms a sealing surface that interacts with the sealing seat, which is preferably rounded. In this case, the sealing surface only comes into contact with the sealing seat via a circumferential contact line, which promotes a self-centering of the valve closure element with respect to the sealing seat.

Further, the plate-like end portion of the valve closure element is preferably connected by a bolt-like or needle-like portion over which the valve closure element is guided. The guidance ensures that the annular gap between the sleeve and the valve closure element is equal in size circumferentially and also remains the same size in case of a stroke of the valve closure element. This is because the mass flow is adjusted via the annular gap in the present case.

BRIEF DESCRIPTION OF THE DRAWINGS

A preferred embodiment of the invention is explained in further detail below with reference to the accompanying drawing.

The sole drawing FIGURE shows a schematic longitudinal section through a gas valve according to the invention in the region of a sealing seat for an outwardly-opening valve closure element.

DETAILED DESCRIPTION

The gas valve 1 shown in the FIGURE comprises a valve body 2, which is formed in a hollow-cylindrical manner at least in parts. On the end side, the valve body 2 forms a sealing seat 3, over which a gas flow path 4 is conducted. In the valve body 2, a valve closure element 5 with a plate-like end portion 6 is accommodated, wherein the plate-like end portion 6 projects into a chamber 9, which is delimited by a sleeve 7 arranged on the valve body 2. This leads to the formation of an annular gap 8 between the sleeve 7 and the plate-like end portion 6 of the valve closure element 5. The flow cross-section of the annular gap 8 is smaller than the flow cross-section between the valve body 2 and the valve closure element 5 in the region of the sealing seat 3 when the gas valve 1 is fully opened, so that the annular gap 8 forms a throttle point in the gas flow path 4. This restricts the mass flow through the gas valve 1, so that the mass flow is precisely adjustable via the annular gap 8 or the surfaces delimiting the annular gap 8.

The jet shaping or jet guiding is effected independently of the adjustment of the mass flow via an inflation opening 10 provided in the sleeve 7, via which the gas located in the chamber 9 is discharged. The inflation opening 10 is delimited by a flow conduction surface 11, which is aligned obliquely to a longitudinal axis A of the gas valve 1, so that the gas jet shaped thereby is purposefully deflected. The position, shape, and size of the inflation opening can be freely selected, because the inflation opening is not used in order to adjust the mass flow. Furthermore, multiple inflation openings 10 can also be provided.

The valve closure element 5 of the gas valve 1 shown has a bolt-like or needle-like portion 13 adjacent to the plate-like end portion 6, via which the valve closure element 5 is guided in the valve body 2. The guidance ensures that the annular gap 8 between the plate-like portion 6 and the sleeve 7 has an equal width circumferentially. This is important in terms of precisely adjusting the mass flow. With the help of the guidance, in particular, an oblique position of the valve closure element 5 during opening can be prevented.

In the present case, the valve closure element 5 also experiences a type of "guidance" in that the sealing seat 3 is tapered and a sealing surface 12 of the valve closure element 5 formed on the plate-like end portion 6 is rounded. In this way, a self-centering of the valve closure element 5 with respect to the sealing seat 3 is achieved.

What is claimed is:

1. A gas valve (1), comprising:
   a valve body (2) which is hollow-cylindrical at least in parts and which forms a sealing seat (3) over which a gas flow path (4) is conducted;
   a reciprocating valve closure element (5) which is accommodated at least partly in the valve body (2) and which has a plate-like end portion (6) arranged outside the valve body, (2) wherein the plate-like end portion (6) interacts with the sealing seat (3); and
   a sleeve (7) which at least partially surrounds the valve body (2) and the valve closure element (5) and which, together with the plate-like end portion (6) of the valve closure element (5), delimits an annular gap (8) which forms a throttle point in the gas flow path (4) downstream of the sealing seat (3),
   wherein, on an end side, the sleeve (7) forms at least one opening (10) for creating a gas jet, a flow area through the at least one opening (10) being greater than a flow area through the annular gap (8),
   wherein the at least one opening (10) is delimited by at least one flow conduction surface (11), which is aligned at an angle to a longitudinal axis (A) of the gas valve (1),
   wherein the flow area through the annular gap (8) is the same over an entire stroke of the valve closure element (5).

2. The gas valve (1) according to claim 1, wherein upon a maximum stroke of the valve closure element (5), the flow area through the annular gap (8) is smaller than a flow area between the valve body (2) and the valve closure element (5) in a region of the sealing seat (3).

3. The gas valve (1) according to claim 2, wherein the gas flow path (4) is conducted through the valve body (2) over the sealing seat (3) and the annular gap (8) into a chamber (9), which is delimited by the sleeve (7).

4. The gas valve (1) according to claim 3, wherein the sealing seat (3) is tapered and opens towards the plate-like end portion (6) of the valve closure element (5).

5. The gas valve (1) according to claim 4, wherein the plate-like end portion (6) forms a sealing surface (12) which interacts with the sealing seat (3).

6. The gas valve (1) according to claim 5, wherein a bolt-like or needle-like portion (13) is connected to the plate-like end portion (6), via which the valve closure element (5) is guided.

7. The gas valve (1) according to claim 5, wherein the sealing surface (12) is rounded.

8. The gas valve (1) according to claim 1, wherein the gas flow path (4) is conducted through the valve body (2) over the sealing seat (3) and the annular gap (8) into a chamber (9), which is delimited by the sleeve (7).

9. The gas valve (1) according to claim 1, wherein the sealing seat (3) is tapered and opens towards the plate-like end portion (6) of the valve closure element (5).

10. The gas valve (1) according to claim 1, wherein the plate-like end portion (6) forms a sealing surface (12) which interacts with the sealing seat (3).

11. The gas valve (1) according to claim 10, wherein the sealing surface (12) is rounded.

12. The gas valve (1) according to claim 1, wherein a bolt-like or needle-like portion (13) is connected to the plate-like end portion (6), via which the valve closure element (5) is guided.

13. A gas valve (1), comprising:
a valve body (2) which is hollow-cylindrical at least in parts and which forms a sealing seat (3) over which a gas flow path (4) is conducted;
a reciprocating valve closure element (5) which is accommodated at least partly in the valve body (2) and which has a plate-like end portion (6) arranged outside the valve body, (2) wherein the plate-like end portion (6) interacts with the sealing seat (3); and
a sleeve (7) which at least partially surrounds the valve body (2) and the valve closure element (5), the sleeve (7) including a cylindrical section,
a bottom section disposed on an end side of the cylindrical section, the bottom section extending transverse to the cylindrical section, and
an opening (10) disposed on the bottom section, the opening (10) delimited by at least one flow conduction surface (11), which is aligned at an angle to a longitudinal axis (A) of the gas valve (1),
wherein the opening (10) is the only opening through which fluid passing through the valve body (2) exits the gas valve (1),
wherein the sleeve (7) and the plate-like end portion (6) of the valve closure element (5) delimit an annular gap (8) which forms a throttle point in the gas flow path (4) downstream of the sealing seat (3),
wherein a flow area through the opening (10) is greater than a flow area through the annular gap (8).

14. The gas valve (1) according to claim 13, wherein the bottom section is approximately perpendicular to the cylindrical section.

15. The gas valve (1) according to claim 13, wherein a portion of the opening (10) is aligned with the valve closure element (5) in a direction of the longitudinal axis (A).

* * * * *